United States Patent
Andorko et al.

(10) Patent No.: US 11,409,854 B2
(45) Date of Patent: Aug. 9, 2022

(54) BIOMETRICS-ENABLED PORTABLE STORAGE DEVICE

(71) Applicant: FotoNation Limited, Ballybrit (IE)

(72) Inventors: Istvan Andorko, Galway (IE); Petronel Bigioi, Galway (IE); Darragh Ballesty, Calabasas, CA (US)

(73) Assignee: FotoNation Limited, Galway (IE)

( * ) Notice: Subject to any disclaimer, the term of this patent is extended or adjusted under 35 U.S.C. 154(b) by 348 days.

(21) Appl. No.: 16/800,968

(22) Filed: Feb. 25, 2020

(65) Prior Publication Data

US 2020/0272719 A1   Aug. 27, 2020

Related U.S. Application Data

(60) Provisional application No. 62/810,840, filed on Feb. 26, 2019.

(51) Int. Cl.
| | |
|---|---|
| G06F 21/32 | (2013.01) |
| G06V 10/143 | (2022.01) |
| G06V 40/50 | (2022.01) |
| G06V 40/18 | (2022.01) |

(52) U.S. Cl.
CPC ............ G06F 21/32 (2013.01); G06V 10/143 (2022.01); G06V 40/197 (2022.01); G06V 40/50 (2022.01)

(58) Field of Classification Search
CPC .... G06F 21/32; G06V 10/143; G06V 40/197; G06V 40/50; G06V 40/18
See application file for complete search history.

(56) References Cited

U.S. PATENT DOCUMENTS

| | | | |
|---|---|---|---|
| 2003/0194112 A1 * | 10/2003 | Lee ................ | G06V 10/147 |
| | | | 382/117 |
| 2008/0130959 A1 * | 6/2008 | Kim ................ | G06F 21/32 |
| | | | 382/117 |

FOREIGN PATENT DOCUMENTS

| | | | | |
|---|---|---|---|---|
| WO | WO-2007015624 A1 * | 2/2007 | ............. | G06F 21/32 |
| WO | WO-2015080309 A1 * | 6/2015 | ........... | G06K 9/0061 |
| WO | WO-2016200084 A1 * | 12/2016 | ............... | G06K 9/00 |

* cited by examiner

*Primary Examiner* — Abhishek Sarma
(74) *Attorney, Agent, or Firm* — Lee & Hayes, P.C.

(57) ABSTRACT

A biometrics-enabled portable storage device may store and secure data via biometrics related to a user's iris. The biometrics-enabled portable storage device may include a camera that captures image data related a user's iris and stores the image data to enroll the user for use of the biometrics-enabled portable storage device. To unlock the data, a user aligns the camera with their iris using a hot mirror and the camera captures iris data for comparison with the iris image data stored during enrollment. If the two sets of image data match, the biometrics-enabled portable storage device may be unlocked and the user may access data stored on the biometrics-enabled portable storage device. If the two sets of image data do not match, then the biometrics-enabled portable storage device remains locked.

14 Claims, 5 Drawing Sheets

BIOMETRICS-ENABLED PORTABLE STORAGE DEVICE

This application claims the benefit of priority to U.S. Provisional Application No. 62/810,840, filed Feb. 26, 2019, which is incorporated herein by reference.

BACKGROUND

Portable storage devices such as universal serial bus (USB) storage devices, memory cards, and the like, provide a convenient way of transporting digital documents, programs, photographs, or other files. These types of portable storage devices are frequently used by people that work remotely and/or work while travelling. Such people often work utilizing portable computing devices such as, for example, laptop computer devices, tablet computer devices, etc. Often, such work may include the use of proprietary data that needs to be protected. Such proprietary data may include, for example, company data, personal data, experimental data, etc. Additionally, work product related to such proprietary data may also need to be protected.

Often, when working remotely or working while travelling, data and/or work product may be included on portable storage devices, such as, for example, USB sticks, that may be plugged into computing devices via a USB port. Thus, the USB stick may be moved among computing devices thereby allowing for data and/or work product included on the portable storage device to be used and/or shared among multiple computing devices.

However, as previously noted, the data and/or work product included on such USB sticks may need to be secure, i.e., protected from unauthorized access. Existing solutions for securing data on portable storage devices have proved to be inadequate.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Overview

Figure 1:
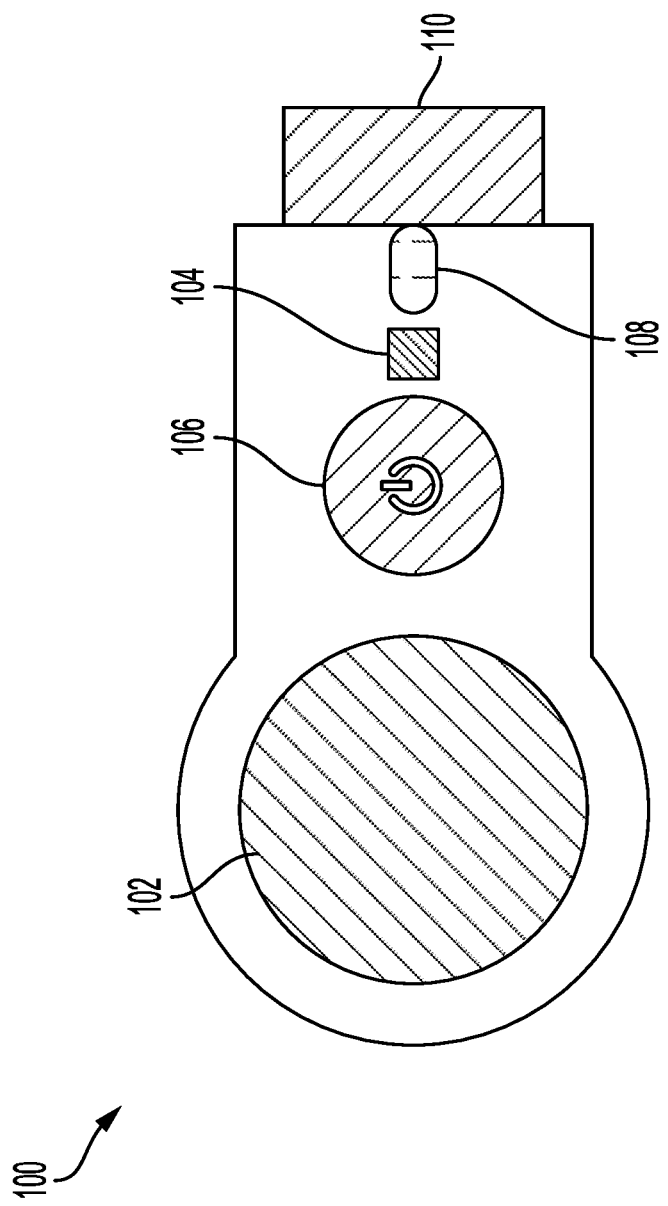
FIG. 1 schematically illustrates an example of a biometrics-enabled storage device.

The present disclosure is directed to portable storage devices. Examples of portable storage devices include, but are not limited to, universal serial bus (USB) storage devices. While examples of USB storage devices are given, "portable storage devices" may also include other types of portable storage devices such as, memory cards (e.g., secure digital (SD) cards), portable hard drives, or the like. Also, the term "portable storage device" should be understood to include any formfactor (e.g., card, stick, etc.), size (e.g., standard, mini, micro, nano, etc.), specification (e.g., USB 1.0, USB 2.0, USB 3.0, USB 3.1, USB 3.2, USB4, etc.), and/or storage capacity.

In some examples, a biometrics-enabled USB portable storage device according to this disclosure may comprise a biometrics-enabled USB stick. The biometrics-enabled USB stick may include a camera to capture in image of an eye (or both eyes in some configurations) of a user and employ iris recognition for authentication. The biometrics-enabled USB stick may require minimal user interaction to authenticate a user in order to access data stored thereon. Iris recognition-based biometrics generally have a false acceptance rate on the order of one-in-one million or better. Thus, the biometrics-enabled USB stick described herein may provide extremely secure on-stick storage. The biometrics-enabled USB stick may be utilized to authenticate the user and/or enable access/use of a PC, laptop computer, tablet computer, or other computing device. Additionally, in some configurations, the biometrics-enabled USB stick may be battery and/or capacitor powered. Since the biometrics-enabled USB stick is based on biometrics, there is no need for third party software to be installed on a target PC, laptop computer, tablet computer, etc.

In some examples, the biometrics-enabled USB stick includes a hot mirror usable to help align the biometrics-enabled USB stick with a user's eye during iris recognition for authentication. In some configurations, the hot mirror is a near infrared (NIR) hot mirror. The hot mirror for the biometrics-enabled USB stick may be utilized to help the user position an eye into the frame of a camera of the biometrics-enabled USB stick behind the hot mirror. In some examples, the camera may be located below the hot mirror of the biometrics-enabled USB stick. If the user can see the eye in the hot mirror, it means that the eye is properly positioned with respect to the camera. Additionally, the hot mirror may act as a band pass filter tuned for the wavelength of a near infrared light emitting diode (LED) included with the biometrics-enabled USB stick. The NIR LED may be utilized to illuminate the eye of the user for iris image data capture and iris recognition purposes. In some configurations, the wavelength of the LED is within the NIR spectrum. For example, the wavelength of the NIR LED may be in a range of 810 nanometers (nm) to 850 nm.

Generally, the camera may be in the form of a module that includes an image sensor, a lens barrel, and the hot mirror. The hot mirror is generally coupled to and covers the lens barrel. The lens barrel is generally located on the image sensor. In some configurations, the camera may be realized using one or more of various technologies, including, complementary metal-oxide-semiconductor (CMOS) and monochrome NIR with deep trench isolation (DTI). The resolution of the camera may be, for example, 1280 pixels by 720 pixels. However, other resolutions may be used. In an example configuration, the lens specifications may include a horizontal field of view (HFOV) of 30 degrees and a modulation transfer function (MTF) of 2 lp/mm at MTF60.

In some configurations, the biometrics-enabled USB stick includes a control button. The control button may be utilized as a power button to power the biometrics-enabled USB stick on and off. The control button may additionally or alternatively be utilized as an enrollment button to enable iris enrollment of a user for use of iris images to authenticate the user.

The biometrics-enabled USB stick, in configurations, may also include an indicator, such as a multi-color LED, liquid crystal display, a speaker, or the like. The indicator may signal to a user that the user has been successfully authenticated by matching the user's iris with an iris image and/or iris image information stored on the biometrics-enabled USB stick. Upon authentication, the biometrics-enabled USB stick may be unlocked and the user may retrieve data stored thereon. Another role of the indicator may be to signal to a user that the enrollment session is ongoing, e.g., has begun and is continuing. The enrollment session, as will be discussed further herein, involves enrolling a user by catching an image of the user's iris and storing the image on the biometrics-enabled USB stick for use in authenticating the user. The indicator may additionally or alternatively be used to signal an operational status of the biometrics-enabled USB stick, e.g., the biometrics-enabled USB stick is currently powered on, the biometrics-enabled USB stick is in the enrollment session, the biometrics-enabled USB stick is in an authentication session. Additionally or alternatively, the indicator may be used to signal a status of the power source, e.g., the battery and/or capacitor of the biometrics-enabled USB stick is low.

The biometrics-enabled USB stick also includes a connector. The connector may comprise a USB standard (e.g., A, B, or C) connector, a USB mini (e.g., A, B, or AB) connector, a USB micro (e.g., A, B, or AB) connector, or a proprietary connector (e.g., a Lightning connector available from Apple Inc.), or any other connector capable of transmitting data and/or power. The connector allows the biometrics-enabled USB stick to be coupled to, e.g., plugged directly or indirectly into, a target PC, laptop computer, notebook computer, or other computing device. In some examples, the biometrics-enabled USB stick may be configured to be plugged directly into the computing device, while in other examples, the biometrics-enabled USB stick may be configured to be coupled to the computing device via a cable or adapter. In some examples, the cable or adapter may be configured to convert a form factor of the connector of the biometrics-enabled UBS stick to a form factor of a port of the computing device.

The biometrics-enabled USB stick also includes a printed circuit board (PCB) substrate. The PCB substrate connects the various components of the biometrics-enabled USB stick. For example, the PCB substrate may connect the camera module through a two-lane mobile industry processor interface (MIPI) interface with a chipset that provides that provides a system-on-chip (SoC). The PCB substrate may also couple the power button and multi-color LED through a general purpose input/output (GPIO) interface to the SoC. The NIR LED may also be coupled to the SoC via the PCB substrate.

The biometrics-enabled USB stick may also include a power supply in the form of a super-capacitor and/or lithium ion (Li-Ion) battery. The super-capacitor and/or battery may also be coupled to the PCB substrate to provide power to the biometrics-enabled USB stick and the various components. The super-capacitor and/or Li-Ion battery is utilized to power up the biometrics-enabled USB stick during enrollment and/or authentication. Since the biometrics-enabled USB stick is generally coupled to a computing device when in use (e.g., after authentication), there is no requirement for a large power storage capacity in the power supply. This is due to the fact that the biometrics-enabled USB stick may obtain power from the computing device when the biometrics-enabled USB stick is coupled to the computing device via the USB-C interface. Thus, the computing device can quickly and easily recharge the super-capacitor and/or Li-Ion battery (e.g., in a matter of seconds) when the biometrics-enabled USB stick is coupled to the computing device. The power provided during the charge may then be utilized to authenticate a user and/or enroll one or more users, as will be described further herein.

The connector is also coupled to the PCB substrate. While all of the components described are at least coupled to the SoC via the PCB substrate, the PCB substrate may couple one or more of the various components directly or indirectly to one or more other components described herein.

As previously mentioned, the biometrics-enabled USB stick includes a chipset that serves as a SoC for operating and/or controlling the biometrics-enabled USB stick. As previously noted, in some configurations, the SoC includes a two-lane MIPI interface that couples the camera module with the SoC via the PCB substrate. The SoC further includes a MIPI decoder that decodes data received from the camera module. The decoded data may then be sent to a processor, such as an advanced reduced instruction set computer (RISC) machine (ARM) central processing unit (CPU), of the SoC. The processor may decode and encode data received. The decoded and encoded data may be forwarded to a memory such as, for example, flash memory. Generally, the included flash memory of the SoC stores all data received by the biometrics-enabled USB stick. The flash memory may also store programs and/or applications (apps) utilized by the biometrics-enabled USB stick. Such programs and/or apps may not be encrypted. Additionally, the flash memory of the SoC may store libraries of iris images and/or iris image information for iris recognition.

In some configurations, the SoC may also include a direct memory access (DMA) controller. The DMA controller may increase speeds of reads and writes to the flash memory. Thus, the DMA controller may also be communicatively coupled with the PROCESSOR.

The SoC in this example also includes a USB controller. The USB controller allows the biometrics-enabled USB stick to be recognized by a computing device when the biometrics-enabled USB stick is coupled to the computing device, when the biometrics-enabled USB stick is unlocked, as described herein. In some configurations, the USB controller is thus coupled to the processor and the DMA controller.

The SoC may also include, in some configurations, a GPIO controller coupled to the processor. The GPIO controller may be coupled to other components, e.g., the power button and the multi-color LED, via a GPIO interface. Thus, the GPIO controller may be used to determine if the biometrics-enabled USB stick is powered on or off. Accordingly, the GPIO controller works with the power button and may control the indictor (e.g., turn the multi-color LED on and off at a designated color) based on whether or not the power button has powered the biometrics-enabled USB stick on or off.

Additionally, in some configurations, the SoC may include an inertial measurement unit (IMU) that is coupled to the processor. The IMU may be in the form of a chip that includes one or more of an accelerometer, a gyroscope, or a magnetometer. Such components may be utilized to determine how the biometrics-enabled USB stick is moving, a current orientation of the biometrics-enabled USB stick, etc.

As will be described further herein, the IMU chip may utilize the determinations of the movement and/or position or orientation of the biometrics-enabled USB stick to help determine a triggering event, e.g., if the biometrics-enabled USB stick is being held, has been dropped, or has been, or is being, stolen based upon measurements by the IMU exceeding a predetermined threshold.

In some configurations, the biometrics-enabled USB stick may include an operating system (OS) such as, for example, a Linux OS or a real time operating system (RTOS). The operating system may include an iris recognition library. The iris recognition library may retrieve images of irises and/or representations of iris images in the form of iris codes and/or other information from authorized or enrolled users from the flash memory. In some configurations, the iris recognition library may store images of irises and/or representations of iris images in the form of iris codes and/or other information from authorized or enrolled users. When a user attempts to unlock the biometrics-enabled USB stick, the camera module obtains an image of the user's iris for comparison with stored image(s) and/or representation(s) of iris image(s), once the hot mirror has confirmed that the iris is properly aligned with the camera, e.g., the lens. Thus, the iris recognition library carries out user iris enrollment and authentication, as will be further described herein. U.S. patent application Ser. No. 15/811,494, entitled "Iris Recognition Workflow," describes examples of iris recognition workflows and is hereby incorporated by reference in its entirety.

The operating system may also include a biometrics logic control unit. The biometrics logic control unit is generally a library that monitors and keeps track of operations of the biometrics-enabled USB stick and sends commands to the camera module for obtaining images of irises. The biometrics logic control unit interfaces with the kernel of the operating system, as well as a USB driver within the kernel.

The operating system may also include a biometrics driver that is implemented in the kernel of the operating system. The biometrics driver authorizes the USB driver to give access to the file system when an iris of a user is authenticated, e.g., the biometrics driver will unlock the USB stick to allow access to the files in the operating system and thus access data stored in the flash memory. By implementing the biometrics driver in the kernel, it can be difficult for someone to bypass the biometrics driver to access the data without proper authentication.

The USB driver within the operating system is generally modified so that the USB driver accepts commands from the biometrics driver. If authentication of an iris of a user is not provided, then the USB driver will not be activated, e.g., the biometrics-enabled USB stick will not be unlocked. Thus, a computing device to which the biometrics-enabled USB stick is connected will not recognize the biometrics-enabled USB stick as a USB device. However, upon successful authentication of an iris, the USB driver will be activated and allow access to the file system of the operating system, and thus the flash memory. Volumes of data may be decrypted as required and provided to the computing device, e.g., the computing device may recognize the biometrics-enabled USB stick as a USB device. While the biometrics-enabled USB stick is coupled to the computing device, the biometrics-enabled USB stick may be charged by the computing device, e.g., the super-capacitor and/or battery may be charged by the computing device, as is known with USB devices coupled to USB ports on computing devices. The charging may occur even if the USB stick is not unlocked.

Thus, in configurations, a user may enroll with the biometrics-enabled USB stick so that the user may unlock the biometrics-enabled USB stick upon proper authentication of the user's iris. During the enrollment stage, the user brings the biometrics-enabled USB stick close to an eye, or at least aligns the biometrics-enabled USB stick with the eye, in such a way that the eye is visible in the hot mirror. Once the eye is visible in the hot mirror, the user may press the power button. The camera module may then obtain an image of the iris and provide the image or a representation of the image, e.g., image information, to the flash memory and/or the iris recognition library for storage. Upon successful enrollment, the LED may turn, for example, green. However, if the enrollment is unsuccessful, the LED may turn, for example, red. The enrollment may automatically be allowed when the enrollment is by an initial user.

After successful enrollment, data may be stored on the biometrics-enabled USB stick in the flash memory. For enrollment, upon initial use of the biometrics-enabled USB stick, an initial user may be enrolled as described. However, if new or additional users are to be enrolled, e.g., authorized to use the biometrics-enabled USB stick, then the initial user, or other enrolled users, need to authorize a new or additional user for enrollment. Accordingly, once the initial user has been authenticated, the biometrics-enabled USB stick may be disconnected from the computing device and the new/additional user may enroll as previously described. If the new/additional user does not successfully enroll within a predetermined amount of time, then the new/additional user may not be enrolled until the process is repeated by coupling the biometrics-enabled USB stick to the computing device and the initial user is once again authenticated and the new/additional user is authorized to try to enroll. Also, a previously enrolled user may wipe their data from the biometrics-enabled USB stick and erase their enrollment. A subsequent user may then be enrolled as if the subsequent user is an initial user.

Once a user has been enrolled, e.g., an image of the enrolled user's iris or a representation of the user's iris is stored in the flash memory and/or the iris recognition library, in order to unlock the biometrics-enabled USB stick, an enrolled user aligns the biometrics-enabled USB stick to their eye. Once the eye is visible in the hot mirror, the user may press the power button. The camera module may then obtain an image of the iris and provide the image (or a representation thereof) to the iris recognition library for comparison. If the iris image matches a stored image (or a stored representation of an image) in the iris recognition library, then the indicator may turn, for example, green indicating a successful authentication. The iris recognition library may provide the successful results to the biometrics logic control unit, which may then communicate the successful results with the biometrics driver and the USB driver to unlock the biometrics-enabled USB stick and provide access to the file system and thereby the data stored on the flash memory. If on the other hand, the authentication is unsuccessful, then the indicator may turn, for example, red. Other colors indicating success or lack thereof may be utilized if desired.

In some configurations, if the battery and/or super capacitor is low on power, the indicator (e.g., multi-color LED) may so indicate (blink with, for example, a red color). Additionally or alternatively, if the battery and/or super capacitor is dead, the biometrics-enabled USB stick may simply become unresponsive. In both situations, if the USB stick is plugged into a computing device for several seconds, then the super-capacitor and/or battery may charge enough so that the enrollment and/or authentication process may occur. As is known with USB devices, while the biometrics-enabled USB stick is being used, e.g., plugged into a computing device, the biometrics-enabled USB stick may receive power from the computing device and thus may charge its power supply with power from the computing device. Thus, the amount of power the super capacitor and/or battery needs to receive in a charge for enrollment and/or authentication may be small.

If a user is unable to authenticate, this may mean that either nobody is enrolled or the person trying to unlock it is not enrolled. If there is nobody enrolled, then the user may be enrolled, e.g., an initial user of the biometrics-enabled USB stick may be automatically enrolled or may be invited to enroll. The invitation may be via some type of signal from the indicator (e.g., a particular color and/or illumination pattern emitted by the multi-color LED). In some configurations, the indicator may include a speaker and thus, the signal may be an audio signal (e.g., tone, series of tones, audible message, etc.). However, if a previous user is already enrolled and the current user is not able to authenticate, the unauthenticated user is not able to recover the data stored on the biometrics-enabled USB stick. However, as previously mentioned, additional users may be enrolled if permission is granted by a previously enrolled user.

As previously noted, the biometrics-enabled USB stick may include, in some configurations, an IMU chip. The IMU chip may be utilized to help determine certain events that might occur during device unlock and being plugged into a computing device. Examples of such events include dropping of the biometrics-enabled USB stick and thereby automatically locking the biometrics-enabled USB stick. It may also be determined that the biometrics-enabled USB stick has been stolen. Such determination may be based upon speed of movement of the biometrics-enabled USB stick, acceleration, etc. This may indicate that the biometrics-enabled USB stick is quickly being moved away from an authorized user and thus has been or is being stolen. Thus, based on one or more of these triggering events, the biometrics-enabled USB stick in such a situation may automatically lock. Such determinations may be based upon measurements by the IMU exceeding a predetermined threshold. Finally, if the biometrics-enabled USB stick has not moved or been accessed for a predetermined amount of time, e.g., the biometrics-enabled USB stick is not being used, then an automatic lock of the biometrics-enabled USB stick may be performed. This may occur whether or not the biometrics-enhanced USB stick is plugged into a computing device.

In some examples, when (or within a predetermined period after) the biometrics-enabled USB stick is removed or unplugged from the computing device, then the biometrics-enabled USB stick will automatically lock and thus, data on the biometrics-enabled USB stick will not be accessible. Additionally or alternatively, if a user is authenticated but the biometrics-enabled USB stick is not coupled to a computing device within a predetermined amount of time (e.g., 30 seconds, 10 seconds, 5 seconds, etc.) then the biometrics-enabled USB stick may automatically lock, e.g., the authentication may time out.

Additionally, in some configurations, the biometrics-enabled USB stick may be utilized to unlock or grant access to a computing device. For example, a user may have their iris authenticated as previously described, thereby unlocking the biometrics-enabled USB stick. Once the biometrics-enabled USB stick is unlocked, then plugging the biometrics-enabled USB stick into a computing device may unlock that computing device. Additionally, in some configurations, two or more users may be needed to authenticate and unlock the biometrics-enabled USB stick. Authentication of multiple users may be performed by sequentially authenticating each user according to the techniques described herein.

EXAMPLE EMBODIMENTS

FIG. 1 schematically illustrates an example of a biometrics-enabled USB storage device 100, e.g., a biometrics-enabled USB stick 100. In configurations, the biometrics-enabled USB stick 100 includes a hot mirror 102, a NIR LED 104, a power button 106, a multi-color LED 108, and a USB-C interface 110. While the present disclosure is described with respect to a biometrics-enabled stick 100, "portable storage devices" may also include other types of portable storage devices such as, memory cards (e.g., secure digital (SD) cards), portable hard drives, or the like. Also, to the term "portable storage device" should be understood to include any formfactor (e.g., card, stick, etc.), size (e.g., standard, mini, micro, nano, etc.), specification (e.g., USB 1.0, USB 2.0, USB 3.0, USB 3.1, USB 3.2, USB4, etc.), and/or storage capacity As is known, the hot mirror 102 may be utilized for optical eye tracking. In configurations, the hot mirror 102 is a near infrared (NIR) hot mirror. The hot mirror 102 for the biometrics-enabled USB stick 100 may be utilized to help a user position an eye into the frame of a camera (not illustrated in FIG. 1) that is included with the biometrics-enabled USB stick 100 behind the hot mirror 102. If the user can see the eye in the hot mirror 102, it means that the eye is properly positioned with respect to the camera. Additionally, the hot mirror 102 may act as a band pass filter tuned for the wavelength of a near infrared light emitting diode (LED) 104 included with the biometrics-enabled USB stick 100. The NIR LED 104 may be utilized to illuminate the eye of the user for iris image data capture and iris recognition purposes. In configurations, the wavelength of the NIR LED is somewhere within the NIR spectrum. For example, in configurations, the wavelength of the NIR LED may be in a range of 810 nanometers (nm) to 850 nm.

In configurations, the biometrics-enabled USB stick 100 includes a power button 106. The power button 106 may be utilized to power the biometrics-enabled USB stick 100 on and off. As will be discussed further herein, the power button 106 may additionally or alternatively be utilized as an enrollment button to enable iris enrollment of a user for use of iris images to authenticate the user.

The biometrics-enabled USB stick 100, in configurations, may also include an indicator in the form of a multi-color LED 108. Other examples of the indicator include, but are not limited to, a liquid crystal display, a speaker, or the like. The multi-color LED 108 may signal to a user that the user has been successfully authenticated by matching the user's iris with an iris image and/or iris image information stored on the biometrics-enabled USB stick 100. The signal may be illumination of the multi-color LED 108 in a particular color and/or with a particular illumination pattern. Thus, the biometrics-enabled USB stick 100 may now be unlocked and the user may retrieve data stored thereon. The multi-color LED 108 may additionally or alternatively signal to a user that the enrollment session is ongoing, e.g., has begun and is continuing. The signal may be illumination of the multi-color LED 108 in a particular and/or with a particular illumination pattern. The enrollment session, as will be discussed further herein, involves catching an image of a potential user's iris and storing the image on the biometric-enhanced USB stick 100 for use in authenticating the user. The multi-color LED 108 may additionally or alternatively signal an operational status of the biometrics-enabled USB stick, e.g., the biometrics-enabled USB stick is currently powered on, the biometrics-enabled USB stick is in the enrollment session, the biometrics-enabled USB stick is in an authentication session. The signal may be illumination of the multi-color LED 108 in a particular color and/or with a particular illumination pattern. Additionally or alternatively, the multi-color LED 108 may indicate a status of the power source, e.g., the battery and/or super capacitor of the biometrics-enabled USB stick 100 is low. The signal may be illumination of the multi-color LED 108 in a particular color and/or with a particular illumination pattern.

Figure 2:
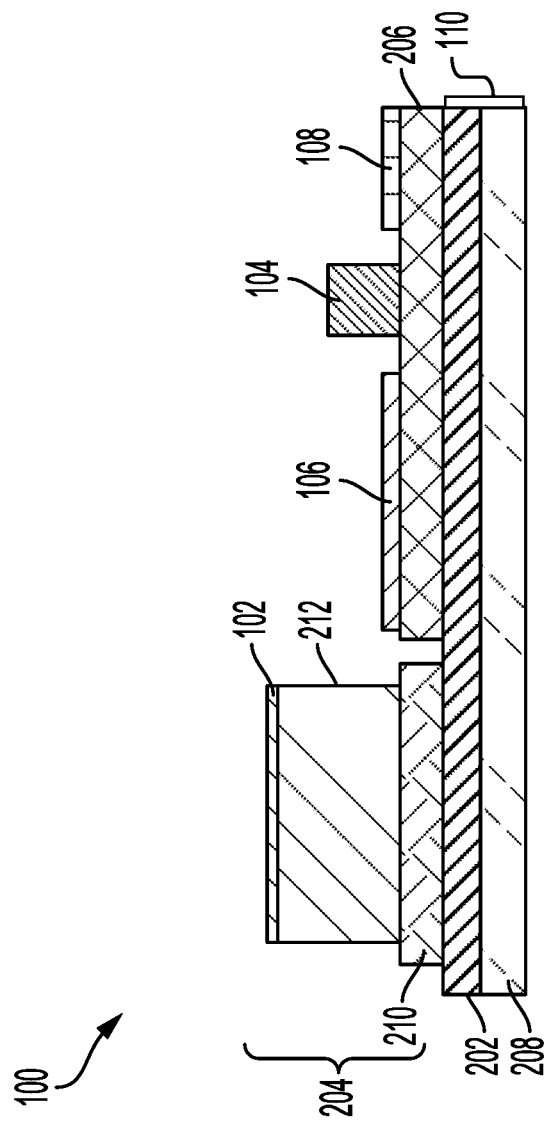
FIG. 2 schematically illustrates an internal design of the biometrics-enabled storage device, such as the biometrics-enabled storage device of FIG. 1.

The biometrics-enabled USB stick 100 also includes a connector or interface 110. The connector 110 may comprise a USB standard (e.g., A, B, or C) connector, a USB mini (e.g., A, B, or AB) connector, a USB micro (e.g., A, B, or AB) connector, or a proprietary connector (e.g., a Lightning connector available from Apple Inc.), or any other connector capable of transmitting data and/or power. The connector 110 allows the biometrics-enabled USB stick 100 to be coupled to, e.g., plugged directly or indirectly into, a target PC, laptop computer, notebook computer, or other computing device. In some examples, the biometrics-enabled USB stick 100 may be configured to be plugged directly into the computing device, while in other examples, the biometrics-enabled USB stick 100 may be configured to be coupled to the computing device via a cable or adapter. In some examples, the cable or adapter may be configured to convert a form factor of the connector of the biometrics-enabled UBS stick 100 to a form factor of a port of the computing device FIG. 2 schematically illustrates an internal design of the biometrics-enabled USB stick 100. As can be seen, the biometrics-enabled USB stick 100 further includes a printed circuit board (PCB) substrate 202, a camera module 204 that serves as a camera, a SoC 206, and a power supply 208.

The PCB substrate 202 connects the various components of the biometrics-enabled USB stick 100. For example, the PCB substrate 202 may connect the camera module 204 through a two-lane mobile industry processor interface (MIPI) interface with a chipset that provides that provides the SoC 206. The PCB substrate 202 may also couple the power button 106 and the multi-color LED 108 through a general purpose input/output (GPIO) interface to the SoC 206. The NIR LED 104 may also be coupled to the SoC 206 via the PCB substrate 202.

Generally, the camera may be in the form of a camera module 204 that includes an image sensor 210, a lens barrel 212, and the hot mirror 102. The hot mirror 102 is generally coupled to and covers the lens barrel 212. The lens barrel 212 is generally located on the image sensor 210. In configurations, the camera module 204 may be realized using one or more of various technologies, including, complementary metal-oxide-semiconductor (CMOS) and monochrome NIR with deep trench isolation (DTI). The resolution of the camera module 204 may be, for example, 1280 pixels by 720 pixels. However, other resolutions may be used if desired. In an example configuration, the lens specifications for the lens barrel 212 may include a horizontal field of view (HFOV) of 30 degrees and a modulation transfer function (MTF) of 2 lp/mm at MTF60.

In configurations, the power supply 208 may be in the form of a super-capacitor and/or lithium ion (Li-Ion) battery. The power supply 208 may also be coupled to the PCB substrate 202 to provide power to the biometrics-enabled USB stick 100 and the various components during enrollment and/or authentication. The power supply 208 is utilized to power up the biometrics-enabled USB stick 100 when the biometrics-enabled stick 100 is not coupled to a computing device. Since the biometrics-enabled USB stick 100 is generally coupled to a computing device when in use (e.g., after authentication), there is no requirement for a large power storage capacity in the power supply 208. This is due to the fact that the biometrics-enabled USB stick 100 may obtain power from the computing device when the biometrics-enabled USB stick 100 is coupled to the computing device via the interface 110. Thus, the computing device can quickly and easily recharge the power supply 208 (e.g., in a matter of seconds) when the biometrics-enabled USB stick 100 is coupled to the computing device. The power provided during the charge may then be utilized to authenticate a user and/or enroll one or more users, as will be described further herein.

The connector 110 is also coupled to the PCB substrate 202. While all of the components described are at least coupled to the SoC 206 via the PCB substrate 202, the PCB substrate 202 may couple one or more of the various components directly or indirectly to one or more other components of the biometrics-enabled USB stick 100 described herein.

Figure 3:
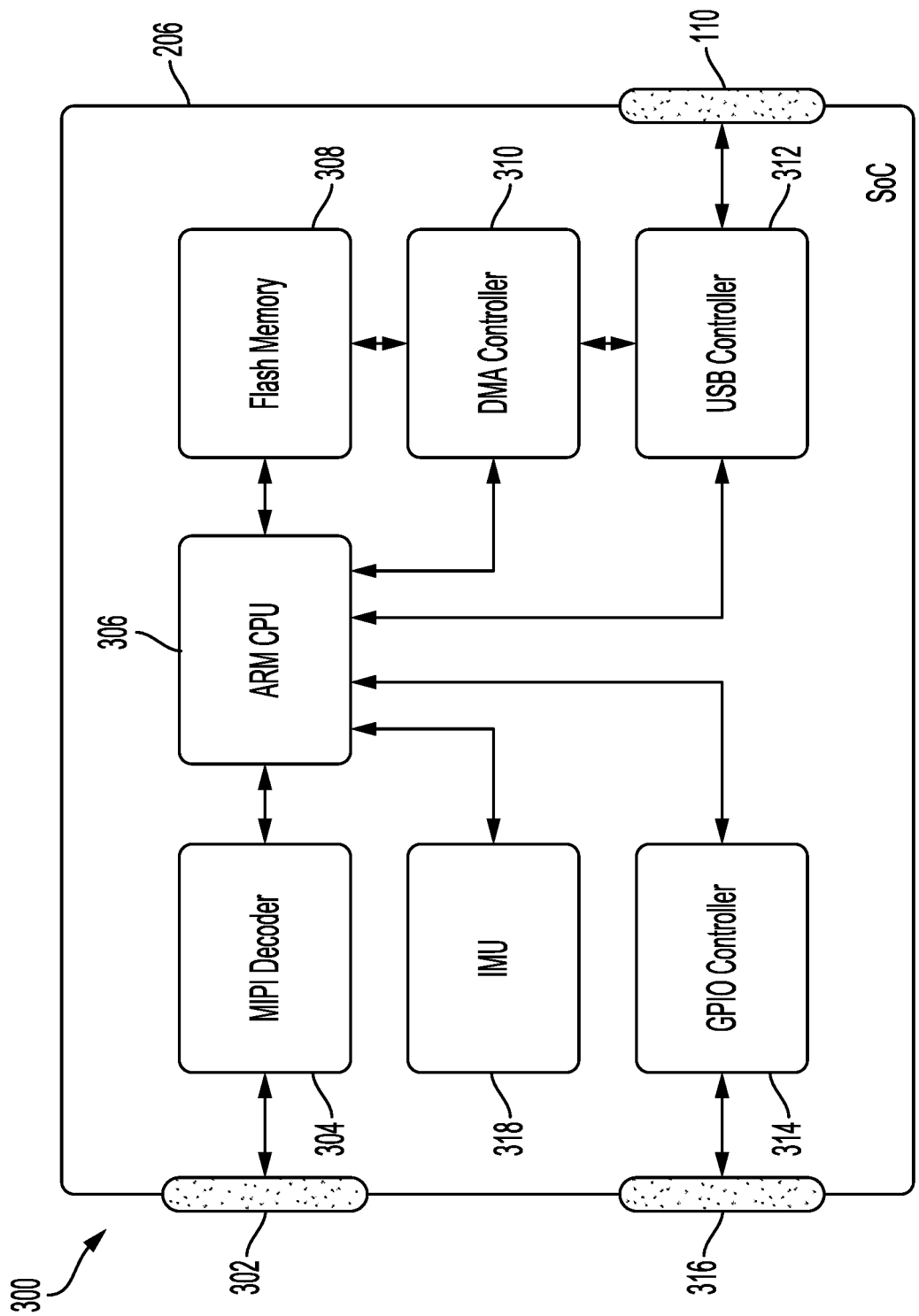
FIG. 3 schematically illustrates an example of a chipset that may serve as a system-on-chip (SoC) for operating and/or controlling a biometrics-enabled storage device, such as the biometrics-enabled storage device of FIGS. 1 and 2.

FIG. 3 schematically illustrates an example of a chipset 300 that may serve as the SoC 206 for operating and/or controlling the biometrics-enabled USB stick 100. As previously noted, in configurations, the SoC 206 includes a two-lane MIPI interface 302 that couples the camera module 204 with the SoC 206 via the PCB substrate 202. The SoC 206 further includes a MIPI decoder 304 that decodes data received from the camera module 204. The decoded data may then be sent to an ARM CPU 306 of the SoC 206. While the example of FIG. 3 includes the ARM CPU 306, other types of processors may be used if desired. The ARM CPU 306 may decode and encode data received. The decoded and encoded data may be forwarded to a memory such as, for example, flash memory 308. Generally, the included flash memory 308 of the SoC 206 stores all data received by the biometrics-enabled USB stick 100. The flash memory 206 may also store programs and/or applications (apps) utilized by the biometrics-enabled USB stick 100. Such programs and/or apps may not be encrypted. Additionally, the flash memory 308 of the SoC 206 may store libraries of iris images and/or iris image information for iris recognition.

In configurations, the SoC 206 may also include a DMA controller 310. The DMA controller 310 may increase speeds of reads and writes from/to the flash memory 308. Thus, the DMA controller 310 may also be communicatively coupled with the ARM CPU 306.

The SoC 206 in this example also includes a USB controller 312. The USB controller 312 allows the biometrics-enabled USB stick 100 to be recognized by a computing device when the biometrics-enabled USB stick 100 is coupled to the computing device and when the biometrics-enabled USB stick 100 is unlocked, as described herein. In some configurations, the USB controller 312 is coupled to the ARM CPU 306 and the DMA controller 310 to assist in allowing or disallowing access to data in the flash memory based on whether the biometrics-enabled USB stick 100 is unlocked.

The SoC 206 may also include, in some configurations, a GPIO controller 314 coupled to the ARM CPU 306. The GPIO controller 314 may be coupled to other components, e.g., the power button 106 and the multi-color LED 108, via a GPIO interface 316. Thus, the GPIO controller 314 may be used to determine if the biometrics-enabled USB stick 100 is powered on or off. Accordingly, the GPIO controller 314 works with the power button 106 and may turn the multi-color LED 108 on and off at a designated color and/or illumination pattern based on whether or not the power button 106 has powered the biometrics-enabled USB stick 100 on or off. Additionally, in some configurations, the SoC 206 may include an IMU 318 that is coupled to the ARM CPU 306. The IMU 318 may be in the form of a chip that includes one or more of an accelerometer, a gyroscope, or a magnetometer. Such components may be utilized to determine how the biometrics-enabled USB stick 100 is moving, the current orientation of the biometrics-enabled USB stick 100, etc. As will be described further herein, the IMU 318 may utilize the determinations of the movement and/or position or orientation of the biometrics-enabled USB stick 100 to help determine a triggering event, e.g., if the biometrics-enabled USB stick 100 is being held, has been dropped, or has been, or is being, stolen based upon measurements by the IMU exceeding a predetermined threshold.

Figure 4:
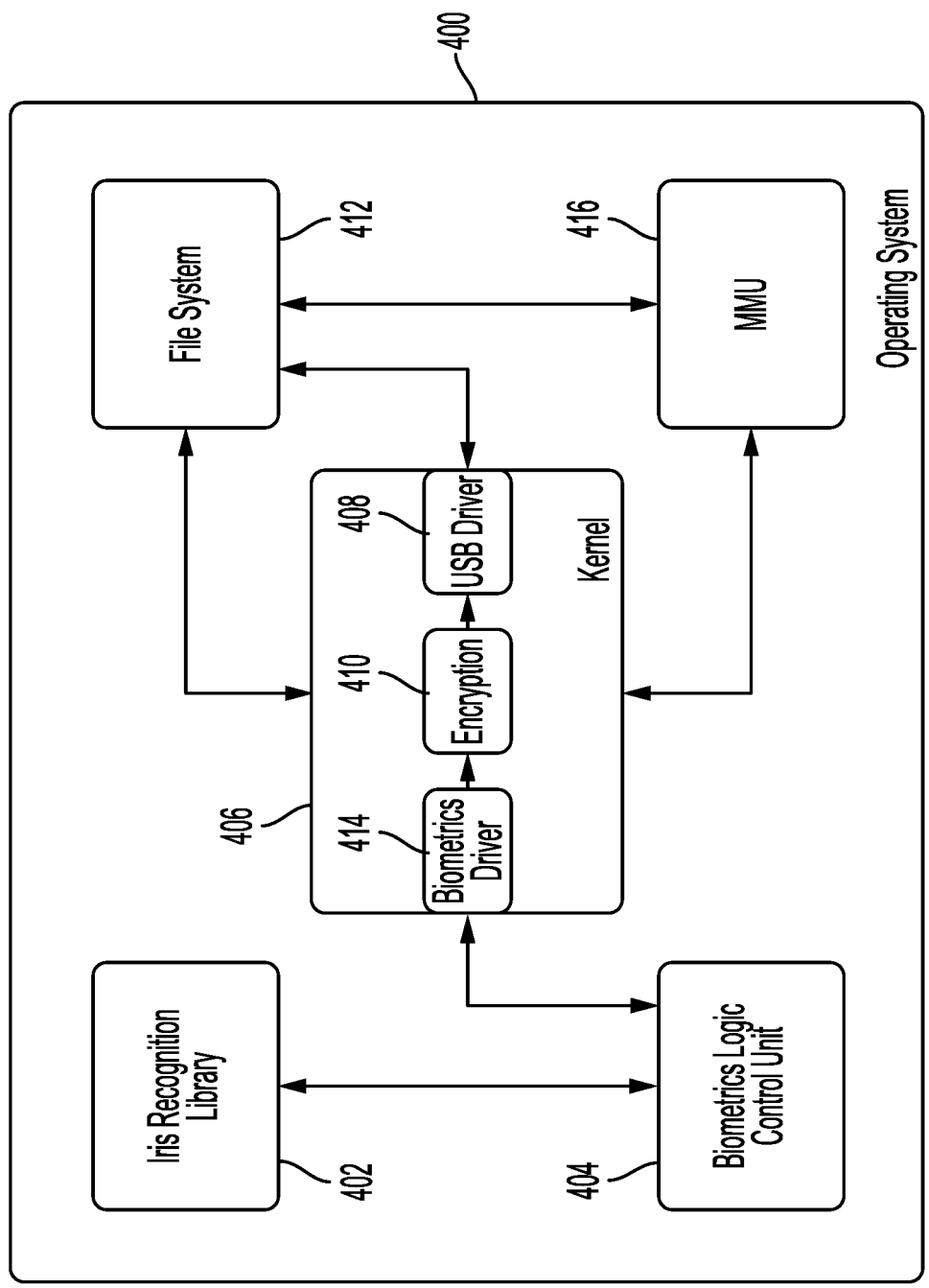
FIG. 4 schematically illustrates a software stack for an operating system for a biometrics-enabled storage device, such as the biometrics-enabled storage device of FIGS. 1 and 2.

Referring to FIG. 4, in configurations, the biometrics-enabled USB stick 100 may include an operating system (OS) 400 such as, for example, a Linux OS or a real time operating system (RTOS), illustrated as a software stack in FIG. 4. The operating system 400 may include an iris recognition library 402. In some configurations, the iris recognition library 402 may retrieve images of irises and/or iris image information from authorized or enrolled users obtained by the camera module 204 from the flash memory 308. In some configurations, the iris recognition library 402 may store images of irises and/or iris image information from authorized or enrolled users obtained by the camera module 204. When a user attempts to unlock the biometrics-enabled USB stick 100, the camera module 204 obtains an image of the user's iris, once the hot mirror has confirmed that the iris is properly aligned with the camera module 204, e.g., the lens 212. Thus, the iris recognition library 402 carries out user iris enrollment and authentication, as will be further described herein.

The operating system 400 may also include a biometrics logic control unit 404. The biometrics logic control unit 404 is generally a library that monitors and keeps track of operations of the biometrics-enabled USB stick 100 and sends commands to the camera module 204 for obtaining images of irises. The biometrics logic control unit 404 interfaces with the kernel 406 of the operating system, as well as a USB driver 408 within the kernel 406. Encryption module 410 may encrypt and decrypt data for a file system 412 and the flash memory 308.

The operating system 400 may also include a biometrics driver 414 that is implemented in the kernel 406 of the operating system 400. The biometrics driver 414 authorizes the USB driver 408 to give access to the file system 412 when an iris of a user is authenticated, e.g., the biometrics driver 414 will unlock the biometrics-enabled USB stick 100 to allow access to the files in the operating system 400 and thus access data stored in the flash memory 308. By implementing the biometrics driver in the kernel, it can be difficult for someone to bypass the biometrics driver to access the data without proper authentication.

The USB driver 408 within the operating system 400 is generally modified so that the USB driver 408 accepts commands from the biometrics driver 414. If authentication of an iris of a user is not provided, then the USB driver 408 will not be activated, e.g., the biometrics-enabled USB stick 100 will not be unlocked. Thus, a computing device to which the biometrics-enabled USB stick 100 is connected will not recognize the biometrics-enabled USB stick 100 as a USB device. However, upon successful authentication of an iris, the USB driver 408 will be activated and allow access to the file system 412 of the operating system 400, and thus the flash memory 308. Volumes of data may be decrypted as required by the encryption module 410 and provided to the computing device, e.g., the computing device may recognize the biometrics-enabled USB stick 100 as a USB device. Likewise, data may be received from the computing device and encrypted by the encryption module 410 for storage by the file system 412 in the flash memory 308.

While the biometrics-enabled USB stick 100 is coupled to the computing device, the biometrics-enabled USB stick 100 may be charged by the computing device, e.g., the power supply 208 in the form of a super-capacitor and/or battery, may be charged by the computing device as is known with USB devices coupled to USB ports on computing devices. The charging may occur even if the biometrics-enabled USB stick 100 is not unlocked.

Thus, in configurations, a user may enroll with the biometrics-enabled USB stick 100 so that the user may unlock the biometrics-enabled USB stick 100 upon proper authentication of the user's iris. During the enrollment stage, the user brings the biometrics-enabled USB stick 100 close to an eye, or at least aligns the biometrics-enabled USB stick with the eye, in such a way that the eye is visible in the hot mirror 102. Once the eye is visible in the hot mirror 102, the user may press the power button 106. The camera module 204 may then obtain an image of the iris and provide the image to the iris recognition library 402 for storage via the ARM CPU 306 as an enrollment template. Upon successful enrollment, the multi-color LED 108 may turn, for example, green. However, if the enrollment is unsuccessful, the multi-color LED 108 may turn, for example, red. The enrollment may automatically be allowed when the enrollment is by an initial user. In configurations, two irises, e.g., both eyes of a user, may be used for enrollment and authentication.

After successful enrollment, data may be stored on the biometrics-enabled USB stick 100 in the flash memory 308 via the ARM CPU 306, the encryption module 410, and the file system 412. For enrollment, upon initial use of the biometrics-enabled USB stick 100, an initial user may be enrolled as described. However, if new or additional users are to be enrolled, e.g., authorized to use the biometrics-enabled USB stick 100, then the initial user, or other enrolled users, need to authorize a new or additional user for enrollment. Accordingly, once the initial user has been authenticated, the biometrics-enabled USB stick 100 may be disconnected from the computing device and the new/additional user may enroll as previously described. If the new/additional user does not successfully enroll within a predetermined amount of time, then the new/additional user may not be enrolled until the process is repeated by coupling the biometrics-enabled USB stick 100 to the computing device and the initial user is once again authenticated and the new/additional user is authorized to try to enroll again. Also, a previously enrolled user may wipe their data from the biometrics-enabled USB stick 100 and erase their enrollment. A subsequent user may then be enrolled as if the subsequent user is an initial user.

Once a user has been enrolled, e.g., an image of the enrolled user's iris or a representation of the user's iris, e.g., iris image information, is stored in the flash memory 308 and/or the iris recognition library 402 as an enrollment template, in order to unlock the biometrics-enabled USB stick 100, an enrolled user aligns the biometrics-enabled USB stick 100 to their eye. Once the eye is visible in the hot mirror 102, the user may press the power button 106. The camera module 204 may then obtain an image of the iris and provide the image (or a representation thereof) to the iris recognition library 402 for comparison. If the iris image matches a stored image (or a stored representation of an image) in an enrollment template in the iris recognition library 402, then the multi-color LED 108 may turn, for example, green indicating a successful authentication. The enrollment template may be stored in the iris recognition library 402 and/or the flash memory 308. The iris recognition library 402 may provide the successful results to the biometrics logic control unit 404, which may then communicate the successful results with the biometrics driver 414 and the USB driver 408 to unlock the biometrics-enabled USB stick 100 and provide access to the file system 412 and thereby the data stored on the flash memory 308. If on the other hand, the authentication is unsuccessful, then the multi-color LED 108 may turn, for example, red. Other colors indicating success or lack thereof may be utilized if desired.

In configurations, if the power supply 208, e.g., the battery and/or super capacitor, is low on power, the multi-color LED 108 may blink with, for example, a red color. Additionally or alternatively, if the power supply 208 is dead, the biometrics-enabled USB stick 100 may simply become unresponsive. In both situations, if the biometrics-enabled USB stick 100 is plugged into a computing device for several seconds, then the super-capacitor and/or battery may charge enough so that the enrollment and/or authentication process may occur. As is known with USB devices, while the biometrics-enabled USB stick 100 is being used, e.g., plugged into a computing device, the biometrics-enabled USB stick 100 may receive power from the computing device and thus may charge a battery or super-capacitor with power from the computing device. Thus, the amount of power the super capacitor and/or battery needs to receive in a charge for the enrollment and/or authentication process may be small.

If a user is unable to authenticate, this may mean that either nobody is enrolled or the person trying to unlock the biometrics-enabled USB stick 100 is not enrolled. If there is nobody enrolled, then the user may be enrolled, e.g., an initial user of the biometrics-enabled USB stick 100 may be automatically enrolled or may be invited to enroll. The invitation may be via some type of signal from the multi-color LED 108, e.g., a particular color and/or illumination pattern emitted by the multi-color LED 108. In some configurations, the biometrics-enabled USB stick 100 may include a speaker and thus, the signal may be an audio signal (e.g., tone, series of tones, audible message, etc.). However, if a previous user is already enrolled and the current user is not able to authenticate, the unauthenticated user is not able to recover the data stored on the biometrics-enabled USB stick 100. However, as previously mentioned, additional users may be enrolled if permission is granted by a previously enrolled user.

As previously noted, the biometrics-enabled USB stick 100 may include, in some configurations, an IMU 318. The IMU 318 may be utilized to help determine certain triggering events that might occur during device unlock and being plugged into a computing device. Examples of such events include dropping of the biometrics-enabled USB stick 100 and thereby automatically locking the biometrics-enabled USB stick 100. It may also be determined that the biometrics-enabled USB stick 100 has been stolen. Such determination may be based upon speed of movement of the biometrics-enabled USB stick 100, acceleration, etc. This may indicate that the biometrics-enabled USB stick 100 is quickly being moved away from an authorized user and thus has been or is being stolen. Thus, the biometrics-enabled USB stick 100 in such a situation may automatically lock. Such determinations may be based upon measurements by the IMU exceeding a predetermined threshold. Additionally, if the biometrics-enabled USB stick 100 has not moved or been accessed for a predetermined amount of time, e.g., the biometrics-enabled USB stick 100 is not being used, then an automatic lock of the biometrics-enabled USB stick 100 may be performed. This may occur whether or not the biometrics-enhanced USB stick 100 is plugged into a computing device.

In some configurations, when (or within a predetermined period after) the biometrics-enabled USB stick 100 is removed or unplugged from the computing device, then the biometrics-enabled USB stick 100 will automatically lock and thus, data on the biometrics-enabled USB stick 100 will not be accessible. Additionally or alternatively, if a user is authenticated but the biometrics-enabled USB stick 100 is not coupled to a computing device within a predetermined amount of time, (e.g., 30 seconds, 10 seconds, 5 seconds, etc.) then the biometrics-enabled USB stick 100 may automatically lock, e.g., the authentication may time out. Authentication of multiple users may be performed by sequentially authenticating each user according to the techniques described herein.

Additionally, in some configurations, the biometrics-enabled USB stick 100 may be utilized to unlock or grant access to a computing device. For example, a user may have their iris authenticated as previously described, thereby unlocking the biometrics-enabled USB stick 100. Once the biometrics-enabled USB stick 100 is unlocked, then plugging the biometrics-enabled USB stick 100 into a computing device may unlock that computing device. Additionally, in configurations, two or more users may be needed to authenticate and unlock the biometrics-enabled USB stick 100.

Figure 5:
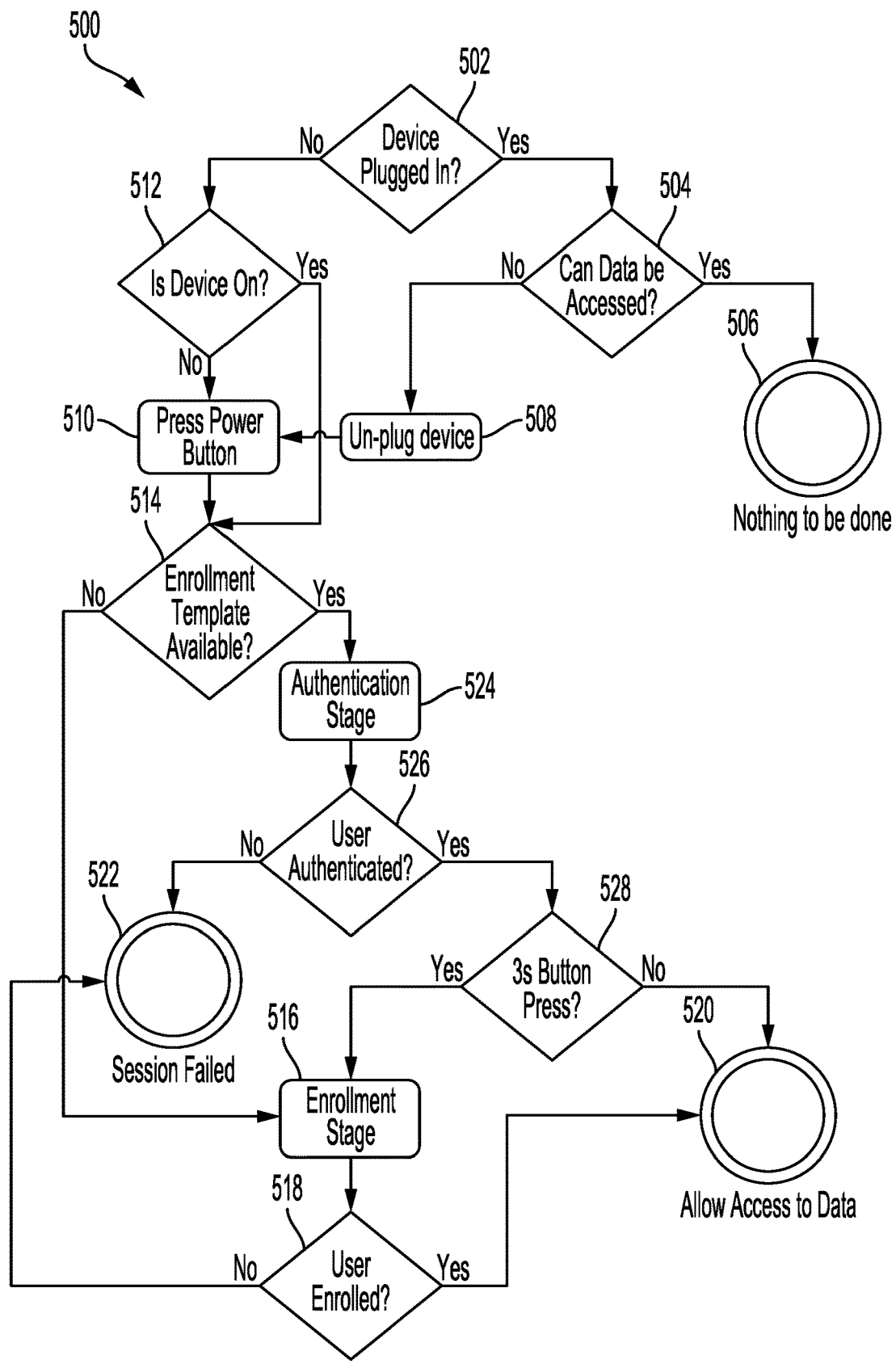
FIG. 5 illustrates a flow diagram of an example workflow for use of a biometrics-enabled storage device, such as the biometrics-enabled storage device of FIGS. 1 and 2.

Referring to FIG. 5, an example workflow 500 for use of the biometrics-enabled USB stick 100 may be described. At 502, it may be determined if the biometrics-enabled USB stick is plugged into a computing device. If yes, then at 504 it is determined if the data may be accessed. If yes, then at 506 there is nothing further is to be done. For example, the biometrics-enabled USB stick has been unlocked by authenticating a user.

However, if the data cannot be accessed, then at 508, the biometrics-enabled USB stick may be unplugged from the computing device and at 510, the power button, e.g., the power button 106 may be pressed to turn on the biometrics-enabled USB stick. If at 502, it is determined that biometrics-enabled USB stick 100 is not turned on, then at 512 it is determined if the biometrics-enabled USB stick is turned on. If not, then the workflow proceeds to 510 and the power button is pressed to turn on the biometrics-enabled USB stick.

Once it is determined that the biometrics-enabled USB stick is powered on, either at 512 or after 510, the workflow 500 proceeds to determine if an enrollment template is available at 514. For example, is there an enrolled user template stored within the iris recognition library? If no, then the workflow 500 proceeds to the enrollment stage at 516 where the user may be enrolled as previously described. At 518 it is determined if the user is successfully enrolled. If yes, then at 520 the biometrics-enabled USB stick may be activated, e.g., unlocked, and access to the data may be provided. However, if at 518 it is determined that the user is unsuccessful at enrolling, then the workflow 500 may end at 522, e.g., the session may end since the user is not able to enroll. For example, if the user is not an initial user, then if the potential user has not obtained authorization from an enrolled user to enroll, then the session fails.

In configurations, if an enrollment template is available at 514, then the workflow 500 proceeds to the authentication stage at 524, where an image of the user's iris is obtained as previously described. The obtained iris image may be compared with the enrollment template in the iris recognition library, e.g., iris recognition library 402 and it may be determined at 526 if the user is authenticated. If the user is not authenticated at 526, then the session fails and the workflow ends at 522. However, if the user is authenticated at 526, then it may be determined at 528 if the power button is pressed, for example, for a predetermined amount of time. For example, the power button may be pressed for three seconds, which may indicate that an additional user is to be enrolled. Thus, the workflow 500 may proceed to the enrollment stage at 516 and if the additional user is successfully enrolled, then the biometrics-enabled USB stick may be unlocked. However, if the additional user does not successfully enroll, then the session fails and the workflow 500 ends at 522. If the power button is not pressed for the predetermined amount of time at 528, then the authenticated user may be allowed access to the data at 520, e.g., the biometrics-enabled USB stick may be unlocked.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A biometrics-enabled universal serial bus (USB) stick comprising:
    a camera module comprising a hot mirror and an image sensor, the camera module configured to capture iris image data;
    a light source proximate to the camera module to illuminate an iris of a user;
    an iris recognition library configured to store an enrollment template comprising stored iris image data and to compare obtained iris image data with the stored image data;
    an inertial measurement unit (IMU);
    a biometrics driver; and
    a USB driver,
    wherein the biometrics-enabled USB stick is configured to be unlocked by the biometrics driver and the USB driver based on the obtained iris image data matching the stored image data, and
    wherein the biometrics-enabled USB stick is configured to automatically lock based at least in part on measurements from the IMU exceeding a predetermined threshold.

2. The biometrics-enabled USB stick of claim 1, further comprising:
    a power supply comprising at least one of a battery or a capacitor.

3. The biometrics-enabled USB stick of claim 1, wherein the biometrics driver is implemented in a kernel of an operating system of the biometrics-enabled USB stick.

4. The biometrics-enabled USB stick of claim 1, further comprising:
    an indicator configured to indicate a status of one or more of an operational status of the biometrics-enabled USB stick or a power supply of the biometrics-enabled USB stick.

5. The biometrics-enabled USB stick of claim 1, wherein the light source comprises a near infrared (NIR) LED and the hot mirror is configured to filter out light not within the NIR spectrum.

6. A method comprising:
    obtaining, by a camera module of a biometrics-enabled universal serial bus (USB) stick, first iris image data of an iris of a user;
    comparing, by an iris recognition library of the biometrics-enabled USB stick, the first iris image data with second iris image data stored at the iris recognition library;
    based at least in part on the comparing, unlocking the biometrics-enabled USB stick;
    receiving one or more measurements from an inertial measurement unit (IMU) of the biometrics-enabled USB stick; and
    based at least in part on the one or more measurements from the IMU exceeding a predetermined threshold, locking the biometrics-enabled USB stick.

7. The method of claim 6, wherein obtaining the first iris image data comprises:
    receiving an input from the user that the iris of the user is aligned within a hot mirror of the camera module.

8. The method of claim 7, wherein the user input comprises interaction with a power button of the biometrics-enabled USB stick.

9. The method of claim 6, further comprising:
    prior to obtaining the first iris image data, charging a power supply of the biometrics-enabled USB stick.

10. The method of claim 6, further comprising, prior to obtaining the first iris image data:
    obtaining, by the camera module of the biometrics-enabled USB stick, the second iris image data, the second iris image data comprising iris image data of the iris of the user; and
    storing the second iris image data at the iris recognition library.

11. A method comprising:
    obtaining, by a single camera module of a biometrics-enabled universal serial bus (USB) stick, first iris image data of a single iris of a user;
    providing the iris image data to an iris recognition library of the biometrics-enabled USB stick;
    creating, by the iris recognition library of the biometrics-enabled USB stick, an enrollment template;
    obtaining, by the single camera module, second iris image data of the single iris of the user;
    comparing, by the iris recognition library the second iris image data with enrollment template stored at the iris recognition library;
    based at least in part on the comparing, unlocking the biometrics-enabled USB stick; and
    based at least in part on one or more measurements from an inertial measurement unit of the biometrics-enabled USB stick exceeding a predetermined threshold, locking the biometrics-enabled USB stick.

12. The method of claim 11, wherein obtaining the first iris image data comprises:
   receiving an input from the user that the iris of the user is aligned within a hot mirror of the single camera module.

13. The method of claim 12, wherein the user input comprises interaction with a power button of the biometrics-enabled USB stick.

14. The method of claim 11, further comprising:
   prior to obtaining the first iris image data, charging a power supply of the biometrics-enabled USB stick.

* * * * *